United States Patent [19]

Tsitsichvili

[11] Patent Number: 4,797,248

[45] Date of Patent: Jan. 10, 1989

[54] GRIPPING APPARATUS FOR A GROUP OF RODS OF NUCLEAR FUEL ASSEMBLY

[75] Inventor: Jean Tsitsichvili, Issy les Moulineaux, France

[73] Assignee: Cogema-Compagnie Generale des Matieres Nucleaires, France

[21] Appl. No.: 936,841

[22] Filed: Dec. 2, 1986

[30] Foreign Application Priority Data

Dec. 2, 1985 [FR] France ................................. 85 17779

[51] Int. Cl.[4] .............................................. G21C 19/33
[52] U.S. Cl. ..................................... 376/261; 294/906
[58] Field of Search ............... 376/261, 264, 268, 271, 376/272; 294/902, 906; 269/265, 266; 29/400 N, 426.3, 723

[56] References Cited

U.S. PATENT DOCUMENTS

| | | | |
|---|---|---|---|
| 1,256,217 | 2/1918 | Fieldhouse | 269/266 |
| 2,754,708 | 7/1956 | Peterson | 269/266 |
| 2,882,771 | 4/1959 | Blazek | 269/266 |
| 3,733,250 | 5/1973 | Van Santen et al. | 376/261 |
| 3,904,048 | 9/1975 | Van Santen et al. | 376/261 |
| 4,374,801 | 2/1983 | Albin | 376/264 |
| 4,551,299 | 11/1985 | Shields | 376/261 |
| 4,636,351 | 1/1987 | Rohr | 376/272 |
| 4,659,536 | 4/1987 | Baudro | 376/261 |
| 4,673,544 | 6/1987 | Rohr | 376/261 |
| 4,683,110 | 7/1987 | Baudro et al. | 376/261 |
| 4,687,245 | 8/1987 | Formanek | 376/271 |
| 4,714,583 | 12/1987 | Wachter | 376/261 |
| 4,723,358 | 2/1988 | Jung et al. | 376/261 |

FOREIGN PATENT DOCUMENTS

| | | |
|---|---|---|
| 006695 | 12/1982 | European Pat. Off. . |
| 146808 | 7/1985 | European Pat. Off. . |
| 1502788 | 8/1969 | Fed. Rep. of Germany . |
| 1363706 | 5/1964 | France . |
| 2533065 | 3/1984 | France . |

Primary Examiner—Charles T. Jordan
Assistant Examiner—Daniel Wasil

[57] ABSTRACT

During the dismantling of a nuclear reactor fuel assembly, there is a simultaneous gripping of all the rods (a) arranged in square grid form in said assembly using a device (10) which effects a clamping or locking at the end of the rows of rods. For this purpose, device (10) has passageways (26) penetrated by the ends of two adjacent rows of rods (a). In said passage ways are trapped mobile members (34, 34') arranged in such a way that each rod is placed between two adjacent members. By applying a locking force on the mobile end members in each passageway (26), each rod is gripped between two members (34, 34'). Preferably, the mobile members (34, 34') are provided with abutments limiting the locking or clamping force individually applied to each rod. For filling the gaps of the grid of rods (a) corresponding to the locations occupied by the guide tubes in the assemblies, rollers (78) are placed in the passageways (26) at the corresponding locations.

9 Claims, 5 Drawing Sheets

GRIPPING APPARATUS FOR A GROUP OF RODS OF NUCLEAR FUEL ASSEMBLY

The invention relates to a gripping apparatus of a group of rods arranged in square grid form in a nuclear fuel assembly.

In nuclear reactors, particularly of the pressurized water type, the fissile material is constituted by sintered uranium dioxide ($UO_2$) pellets. These pellets are placed in the form of piles in metal cans in order to form the fuel rods. The rods are arranged in bundle or group form in accordance with a square grid in nuclear fuel assemblies and are then juxtaposed to form the reactor core.

Figure 1:
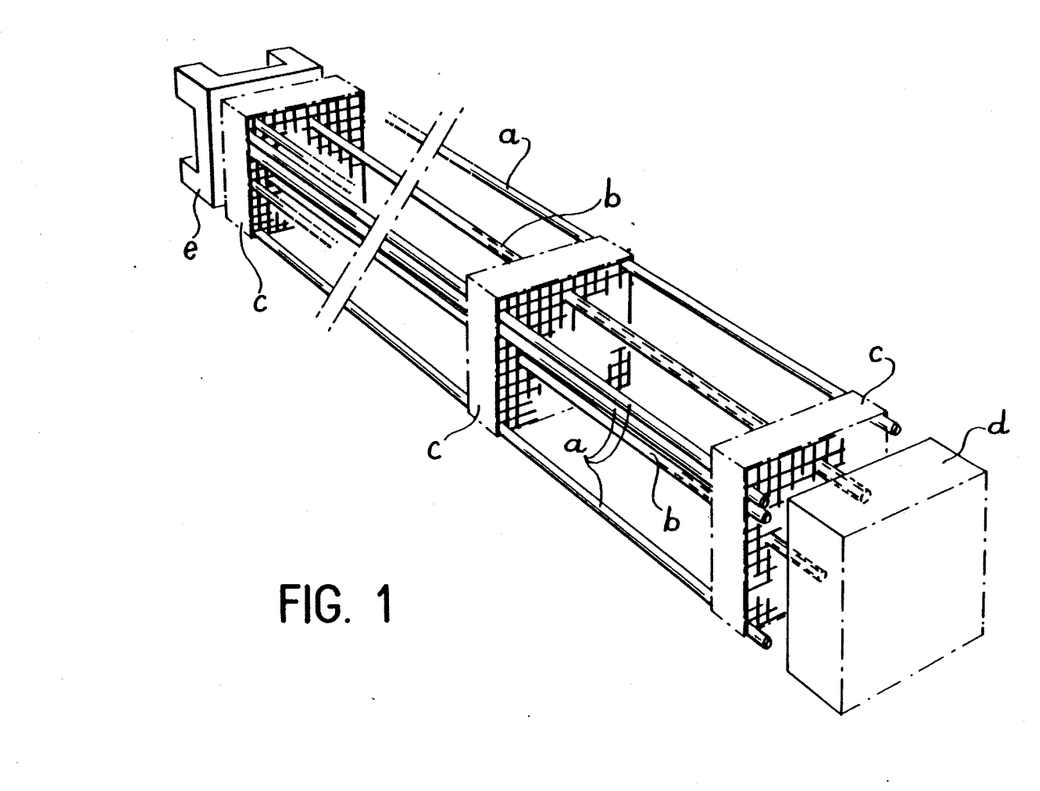
FIG. 1, already described, a perspective view diagrammatically showing in fragmentary manner a nuclear fuel assembly of a pressurized water nuclear reactor.

FIG. 1 is a perspective view diagrammatically showing a nuclear fuel assembly. The latter comprises, besides the bundle of rods (a), a certain number of guide tubes (b) occupying the place of certain rods (a) in the square grid. In order to clarify the drawing, only one rod and one guide tube are shown. Most of the guide tubes (b) are used for the sliding guidance of the not shown control member absorbing rods.

The relative position in between the rods and tubes is ensured by spacing rods (c), of which there are generally eight and whereof only three are shown in FIG. 1. These grids constitute the framework of the assembly.

The assembly also comprises two end parts constituted by an upper end fitting (d) and a lower end fitting (e). These end fittings are respectively used for handling the assembly and fixing the latter in the reactor core, being fixed to the ends of the guide tubes (b). When such an assembly has been irradiated in a nuclear reactor core, it must be dismantled so that the fuel can be reprocessed.

A first stage of the dismantling of assemblies consists of cutting the guide tubes (b) at a level below that of the upper end of rods (a), in order to free the access to said end of the rods, following the removal of the upper end fitting (d), the upper grid and portions of the guide tubes attached thereto.

During a second stage, the rods (a) are grasped by their ends, so that they can be extracted from the remaining part of the assembly framework. The invention specifically relates to a gripping apparatus for performing this operation.

When the rods have been extracted, the actual dismantling is at an end and the rods are generally stored in a pool in order to enable the activity thereof to decay. When this decay is considered to be adequate, the rods are cut and the fuel contained therein is dissolved before being reprocessed.

In the present state of the art, there is no gripping apparatus making it possible in single operation to extract the rods from the remainder of the assembly framework during the second dismantling stage. Moreover, when they ensure the simultaneous gripping of several rods, the existing gripping apparatuses are formed by the juxtaposing of several independent gripping members, e.g. of the self-locking ball type, each ensuring the gripping of a single rod.

These existing gripping apparatuses consequently lead to a relatively long handling time resulting from the large number of operations necessary for the extraction of all the rods of the same assembly. Moreover, there is a risk of the rods breaking because they may have been locked in the assembly framework as a result of deformation due to irradiation thereof. Thus, the locking or clamping force exerted by the balls of each independent gripping member on the rod which it grasps is not limited.

The object of the present invention is a gripping apparatus designed so that it can simultaneously grip all the rods of the bundle or group contained in a nuclear fuel assembly and as shown in FIG. 1, preferably by applying a limited force or stress to each of the rods. It takes into account the differential elongation of the rods of the same assembly following irradiation.

Thus, the invention proposes an apparatus for gripping a group of rods arranged in parallel rows of at the most (n) rods in accordance with a square grid in a nuclear fuel assembly, said apparatus being characterized in that it comprises:

a body having a central portion recessed according to a rectangle, whereof the dimensions are at least equal to the external dimensions which the group has in section, parallel partitions dividing said central portion into (p) passageways, each of which is able to receive the ends of the rods of at the most two rows of adjacent rods;

(p) rows of (n+1) mobile members, which are located in each of the (p) passageways in such a way that the end of each rod can be placed between two adjacent mobile members of the same passageway;

locking or clamping means located in the body on at least one side of said central portion, so as to be able to apply to the ends of the rods and the mobile members contained in each of the passageways a force tending to lock each rod between two adjacent mobile members of the same passageway.

The essential originality of this appratus is based on the gripping mode, each row of rods being subjected to a gripping or clamping force applied to the ends of said rod and transferred from one rod to the next by mobile members interposed between each of the rods. In this way, it is possible to simultaneously grip all the rods of the assembly.

To take account of the fact that in practice the group of rods generally comprises less than (n) rods in certain of the rows, because the locations previously occupied by the guide tubes remain empty, the apparatus also comprises in a preferred manner, rollers having an external diameter essentially equal to that of the rods, said rollers being placed between certain of the mobile members so that they can fill the gaps of the grid.

According to a preferred embodiment of the invention in which each of the passageways can receive the ends of rods of two rows of adjacent rods, the mobile members are shaped like crosses and have one branch placed between the two rows of adjacent rods of the same passageway and whereof one end can bear on an end of said branch of the adjacent mobile member, in order to limit the force applied to the rods when the locking means are put into operation.

In order to facilitate the automation of the realization of the gripping apparatus, the latter can also comprise an ejector having a plate mobile with respect to the body in a direction orthogonal to the rectangle formed by the recessed central portion, said plate carrying a group of bars arranged in accordance with a grid identical of the rods and able to take the place of the latter, in order to eject them from the gripping apparatus following the loosening of the locking means. Elastic means can then urge the ejector towards a position in which the bars are placed between the mobile members instead of the rods.

According to a preferred embodiment of the invention, the locking means comprise two rows of (p) plungers located in the body on two opposite sides of the central portion, one plunger of each row entering each of the passageways at the opposite ends thereof and actuating means able to displace the plungers towards said central portion to exert said force on the ends of the rods and the mobile members. Each plunger can be constructed in two parts and comprise an elastic device by which the force exerted by the actuating means is transferred between these two parts.

In the preferred embodiment of the invention, the actuating means comprise two wedge devices acting on each row of plungers, said wedge devices being able occupy a stable opening position and a stable closing position. As a result of this feature, it is possible to control the opening and closing of the gripping device with the aid of two sets of fixed station jacks located respectively level with a gripping station and a release station of the rods. The gripping apparatus by means of which the group of rods is transported from one station to the other is consequently simplified.

In practice, each wedge device preferably comprises a first part mobile in the body in a sliding direction whilst moving towards and away from the central portion, said first part bearing on one of the rows of plungers and a second part mobile in the body in a direction orthogonal to the sliding direction of the first part, said two parts cooperating with one another by a system of ramps terminated by flats defining said stable opening and closing positions.

A description will now be given in non-limitative, exemplified manner of a preferred embodiment of the invention with reference to the attached drawings, wherein show.

Figure 2A:
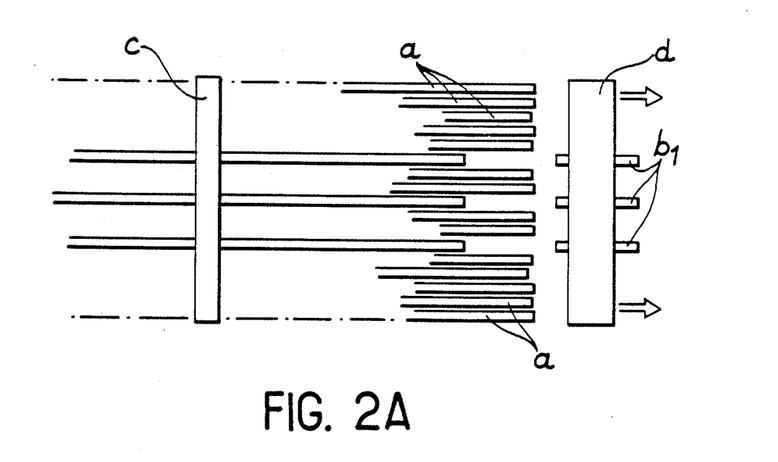
FIG. 2a, a side view diagrammatically illustrating the first stage of dismantling said assembly consisting of separating from the remainder of the assembly the upper end fitting and the guide tube portions fixed thereto.

On referring to FIG. 2a, it can be seen that the first stage of dismantling a nuclear fuel assembly like that diagrammatically shown in FIG. 1 consists of separating from the remainder of the assembly, the upper end fitting (d), together with the sections ($b_1$) of the guide tubes remaining attached thereto. This operation is carried out by internal cutting of the guide tubes at a certain distance below the upper end of rods (a), the assembly being considered vertically in the position which it occupies in the reactor core. Generally, the upper grid of the assembly is also dismantled during this operation, because its presence might subsequently prevent a correct use of the gripping apparatus according to the invention.

It is pointed out that this first dismantling operation is of a conventional nature and does not form part of the invention. It will therefore not be described in greater detail.

The second stage of dismantling consists of extracting the group of rods (a) from the remainder of the assembly framework constituted by the lower end fitting (e) (FIG. 1), the remaining grids (c) and the remaining parts ($b_2$) of the guide tubes.

Figure 2B:
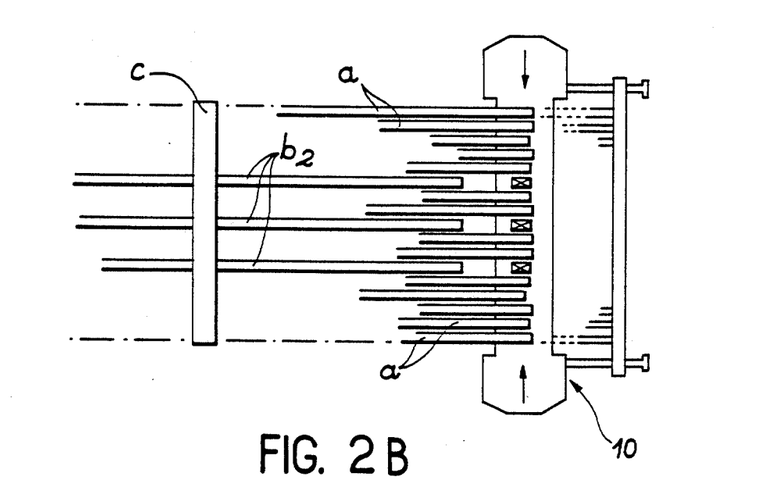
FIG. 2b, a view comparable to FIG. 2a very diagrammatically illustrating the second stage of dismantling the assembly of FIG. 1 consisting, using the gripping apparatus according to the invention, of extracting the bundle of rods from the remainder of the assembly.

According to the invention, this second stage is performed in a single operation diagrammatically illustrated in FIG. 2b using a gripping apparatus 10, which will now be described in detail with reference to FIGS. 3 to 6.

To facilitate understanding, gripping apparatus 10 is allocated an orthonormalized coordinate system XYZ, in which the axes X and Y extend in two directions defined by the square grid formed by the rods to be gripped, axis Z being parallel to the axes of the rods, when a bundle of rods is gripped by apparatus 10.

Figure 3:
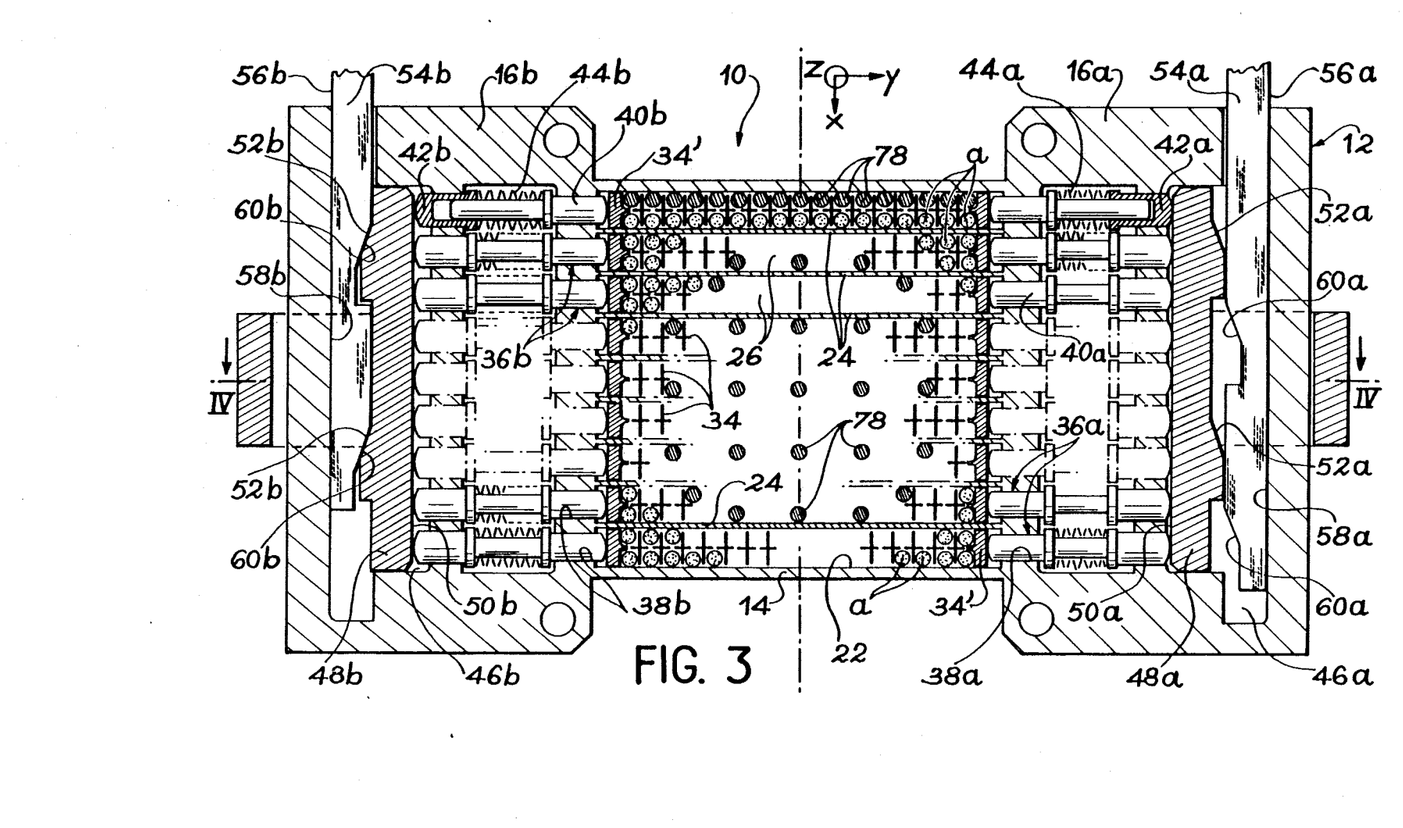
FIG. 3, a diagrammatic sectional view, transversely of the bundle of rods along line III—III of FIG. 4, showing the gripping apparatus according to the invention, said apparatus being in the open position in the left-hand part of FIG. 3 and in the closed position in the right-hand part thereof.
Figure 4:
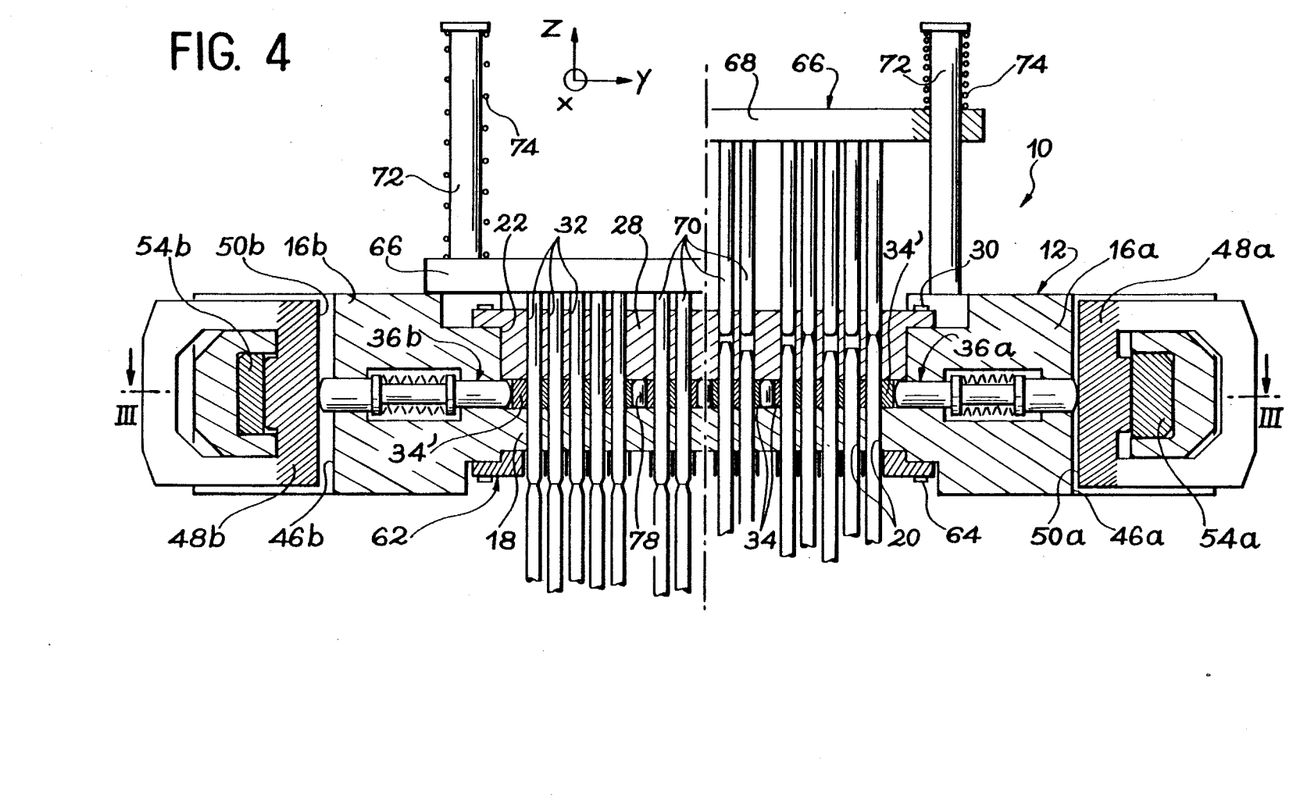
FIG. 4, a longitudinal sectional view along line IV - IV of FIG. 3.

FIGS. 3 and 4 show that the gripping apparatus according to the invention comprises a body 12 constituted by a central portion 14 and two identical side portions 16a, 16b disposed on either side of the central portion 14.

FIG. 4 shows that the central portion 14 comprises a rectangular or square flat plate 18, whose dimensions slightly exceed the overall dimensions which the bundle of rods (a) of an assembly have in section. This plate is parallel to plane X, Y and its sides are oriented in directions X and Y.

Plate 18 is traversed by cylindrical perforations 20, whose axes are parallel to direction Z. Perforations 20 are disposed in accordance with a grid identical to the square grid formed by the group of rods (a) to be gripped. For example for a conventional square section assembly, said grid comprises 17 rows in direction Y of at the most 17 rods each. However, no perforation is provided at the locations previously occupied by the guide tubes in the group of rods. The diameter of the perforations 20 slightly exceeds the external diameter of the rods to be gripped.

On the face of plate 18 opposite to the face by which rods (a) penetrate perforations 20 (i.e. on the upper face of plate 18 considering FIG. 4), said perforations issue into a rectangular recess 22. The section of this recess in plane X, Y is identical to that of plate 18.

As is more specifically shown by FIG. 3 in its part closest to the perforated plate 18, recess 22 is subdivided into passageways 26 by planar, parallel partitions 24 extending parallel to plane Y, Z between lateral portions 16a, 16b of body 12. Passageways 26 all have the same dimensions. More specifically, the partitions 24 are disposed in such a way that two adjacent rows of holes 20 (considered in direction Y) issue into each of the passageways 26. In the example of an assembly with a square section having 17 rows of at the most 17 rods, there are nine passageways 26, as illustrated by FIG. 3, whereby only one row of rods is received in the lateral passageways (that at the top in FIG. 3).

As illustrated in FIG. 4, recess 22 is closed on the side opposite to plate 18 by a part 28 fixed to the central portion 14 of body 12, e.g. by screws 30. Part 28 is also traversed by cylindrical perforations 32 arranged along a grid identical to that formed by perforations or holes 20, perforations 20 and 32 being aligned in pairwise manner. Perforations 32 also have a diameter slightly exceeding the external diameter of the rods (a) to be gripped.

As is more specifically illustrated in FIG. 3, a row of mobile cross-shaped members 34 is placed in each of the passageways 26 defined by partitions 24. These member 34 will be described in greater detail hereinafter. It is merely pointed out that they are placed in each passageway in such a way that two holes 20 belonging to two adjacent rows in direction Y (as well as the facing holes 32) issue between two adjacent crosses of the same passageway. The mobile members 34 placed at the ends of each of the passageways 26 have a slightly different shape. More specifically, the face thereof turned towards the end of the passageway is planar.

The gripping apparatus according to the invention also comprises locking or clamping means located in the lateral portions 16a, 16b of body 12.

These locking means firstly comprise in each of the lateral portions 16a, 16b, a series of plungers 36a, 36b. In the considered example, each of the series or rows of plungers is constituted by nine identical plungers. The plungers 36a, 36b having a generally cylindrical configuration are aligned pairwise parallel to direction Y. Moreover, the axes of all the plungers 36a, 36b are all placed in the same plane parallel to plane X, Y. Each plunger 36a, 36b is received in a bore 38a, 38b formed in portion 16a, 16b respectively of body 12 and issuing into recess 22. More specifically, a bore 38a, 38b issues at each of the ends of passageways 26 defined by partitions 24.

Each of the plungers 36a, 36b comprises a front part 40a, 40b, whereof the convex end abuts against the planar rear face of the corresponding mobile member 34'.

Each of the plungers 36a, 36b also comprises a rear part 42a, 42b able to slide in direction Y with respect to the front part 40a, 40b. The front parts 40a, 40b and rear parts 42a, 42b of each of the plungers are subject to the action of a stack of elastic washers 44a, 44b so that move away from one another, tending to increase the length of each of the plungers 36a, 36b. The rear part 42a, 42b of the plungers of each row of plungers 36a, 36b issues into a recess 46a, 46b formed within the corresponding portion 16a, 16b of body 12.

Each of the rows of plungers 36a, 36b cooperates with actuating means respectively located in recesses 46a, 46b. These actuating means are in each case constituted by a wedge device formed respectively by two parts 48a, 54a and 48b, 54b.

Parts 48a, 48b are positioned so as to slide in direction Y in each of the recesses 46a, 46b. Each of the parts 48a, 48b has a planar front face 50a, 50b, parallel to plane X, Z and on which bears the convex end of each of the rear parts 42a, 42b of the corresponding plungers.

The guidance of parts 48a, 48b in recesses 46a, 46b is obtained by sliding the end faces of the parts in direction X on planar surfaces formed in the recesses parallel to plane Y, Z.

Moreover and as can best be seen in FIG. 4, each of the parts 48a, 48b has in its central portion in direction X an extension having a section in the form of an O. This configuration makes it possible to ensure a satisfactory guidance of these parts during their displacement. Thus, end faces of portions 16a, 16b spaced in direction Z are in sliding contact with planar surfaces parallel to the plane X, Y formed within O-shaped extensions of parts 48a, 48b.

As can be seen in FIG. 3, each of the parts 48a, 48b is provided on its rear face with two ramps 52a, 52b, which are terminated by planar portions parallel to plane X, Y.

The displacement of each of the parts 48a, 48b in direction Y is controlled by another part 54a, 54b interposed between the rear planar face 56a, 56b of recess 46a, 46b, parallel to plane X, Y and the rear face of the corresponding part 48a, 48b. Each of the parts 54a, 54b is extended out side body 12, in direction X, so as to be displaceable in said direction in one or other sense, e.g. under the action of a not shown jack. Each part 54a has a planar rear face 58a, 58b, which slidingly bears on the rear face 56a, 56b of the corresponding recess.

The front face of each of the parts 54a, 54b is substantially complementary of the rear face of each of the parts 48a, 48b. More specifically, each part 54a, 54b also has two ramps 60a, 60b spaced by the same distance as ramps 52a, 52b and issuing at their ends on the planar portions parallel to plane X, Z.

As is shown to the left of FIG. 3, when parts 54a, 54b occupy their unlocking position, in which they are removed to the maximum from body 12 of the apparatus in direction X, ramps 60a, 60b face ramps 52a, 52b. This position is stable, because the planar portions formed at the foot of ramps 52a, 52b of parts 48a, 48b bear on the planar portions formed at the top of ramps 60a, 60b of parts 54a, 54b. Parts 48a, 48b are then retracted rearwards within recesses 46a, 46b. Under the action of elastic washers 44a, 44b, the rear part 42a, 42b of each of the plungers is also drawn rearwards. The compression of the elastic springs is thus substantially eliminated, so that no locking force is exerted in direction Y by the front portions 40a, 40b of the plungers on the end members 34'.

However, as illustrated to the right in FIG. 3, when parts 54a, 54b are forced to the maximum into recesses 46a, 46b in direction X, said parts push back parts 48a, 48b towards the front due to the wedge effect, as a result of the cooperation of ramps 52a, 52b and 60a, 60b. Thus, a stable locking position is attained, in which the planar portions formed at the top of ramps 52a, 52b of parts 48a, 48b bear on the planar portions formed at the top of ramps 60a, 60b of parts 54a, 54b.

In this position, the rear portions 42a, 42b of the plungers are also pushed back to the maximum in the forwards direction in direction Y, which has the effect of compressing the elastic washers 44a, 44b. Due to this compression, a locking force is applied by the front portions 40a, 40b of the plungers on the mobile end members 34'.

As is more particularly illustrated in FIG. 4, the gripping apparatus also comprises a grid 62 ensuring a prior positioning of the ends of rods (a) before they penetrate the apparatus. Grid 62 is fixed to the central portion 14 of body 12 from the side of plate 18 opposite to recess 22. Grid 26 comprises a frame by which it is fixed to body 12, e.g. by means of screws 64 and two rows of parallel thin sheets regularly arranged in directions X and Y, so as to define square cavities between them. The dimensions of these cavities are such that each of the holes 20 issues into one of the cavities.

If the ends of certain of the rods to be gripped are slightly staggered with respect to the grid which they formed when the assembly was new, plate 62 makes it possible to recenter these ends in order to facilitate the penetration thereof into holes 20.

The gripping apparatus according to the invention also comprises an ejector 66, whose main function is to permit the ejection of rods (a) from the apparatus after said rods have been transported and the locking force has been slackened.

As shown in FIG. 4, said ejector 66 essentially comprises a flat plate 68 parallel to plane X, Y and a group of bars 70. Plate 68 is placed outside body 12 facing the central portion 14 of the latter and more specifically on the side of part 28 closing recess 22.

Preferably, the generally square plate 68 is slidingly received on columns 72 projecting over the corresponding face of body 12 parallel to direction Z. Columns 72 traverse plate 68 in the vicinity of each of its angles. A spring 74 is compressed between plate 68 and a shoulder formed at the end of each column 72, so as to move plate 68 towards plate 28.

Bars 70 are fixed to the face of plate 68 oriented towards plate 28 in accordance with a grid identical to that formed by perforations 20 and 32. Moreover, these bars 70 have a uniform circular section, whose diameter is substantially identical to that of the rods to be gripped. The axis of each of the bars coincides with the axis of one of the pairs of perforations 20, 32, the action of springs 74 has the effect of making said bars 70 enter each of the holes 32, then pass between mobile members 34 and finally into each of the perforations 20, as illustrated by the left-hand part of FIG. 4.

When it is wished to use the described apparatus for gripping the ends of a group of rods (a), in order to extract same from a nuclear fuel assembly, the ends of the rods are firstly introduced into perforations 20, said operation being facilitated by the presence of grid 62. Generally this operation is performed whilst maintaining fixed the assembly containing the rods and by progressively moving the gripping apparatus 10 so as to introduce the ends of the rods into perforations 20, then between members 34 and finally into perforations 32, whilst forcing back ejector 66 in such a way that only the ends of bars 70 remain introduced in perforations 32. This situation is shown to the right of FIG. 4.

Figure 5:
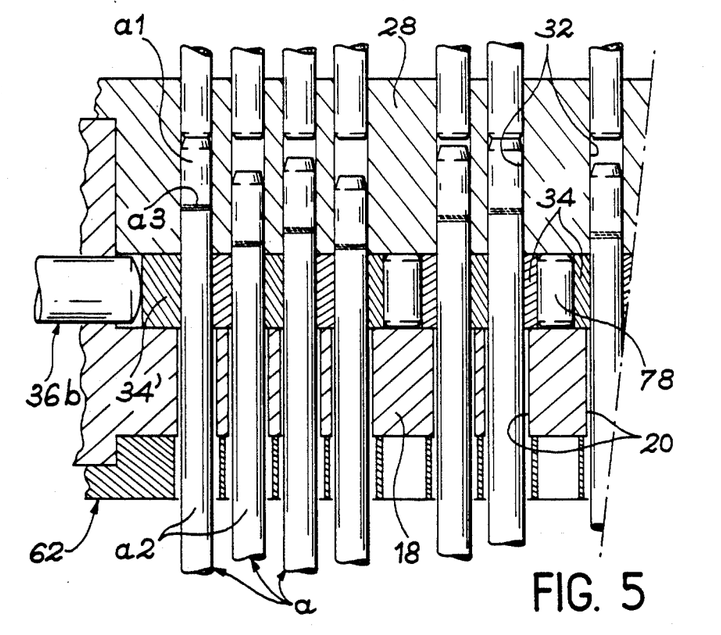
FIG. 5, a larger scale view comparable to FIG. 4 and showing the length differences of the rods to be gripped.

As is more specifically illustrated by FIG. 5, the introduction of the ends of rods (a) into the gripping apparatus is performed in such a way that the upper end fitting ($a_1$) of each of the rods completely penetrates the perforation 32 formed in part 28. Thus, the actual gripping takes place on can ($a_2$), below the welding bead ($a_3$) conventionally separating the latter from the upper end fitting. This precaution makes it possible to guarantee the quality of the gripping on each of the rods, despite the displacement along Z generally existing between the ends of the rods and which is shown in FIG. 5. This displacement is due to the differential elongation of the rods of the same assembly following irradiation.

In this position, part of each of the rods to be gripped traverses the passageways 26 defined by partitions 24. As is more specifically illustrated in FIG. 6, on starting from the end of each of the passageways, one successively finds the front rounded part 40a, 40b of the corresponding plunger, the mobile end member 34', two juxtaposed rods (a), a mobile member 34, two other rods (a), etc.

Figure 6:
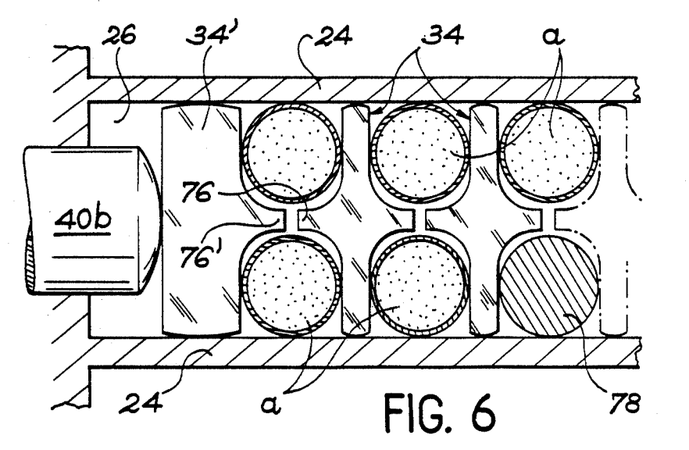
FIG. 6, a larger scale view comparable to FIG. 3 showing in greater detail the structure of the cross-shaped mobile members between which are locked the ends of the rods.

More specifically, the mobile end member 34' has a planar rear face on which bears the convex end of the plunger part 40b. On its front face, member 34' has two planar surfaces able to bear on each of the rods (a) and between which projects an intermediate branch 76'.

Each of the mobile members 34 is shaped like a cross and whereof one branch positioned transversely with respect to the corresponding passageway, serves as a bearing support by its opposite faces for the four adjacent rods. The other branch 76 of the cross formed by each of the members 34 is constituted by two portions projecting on either side of the first branch between adjacent rods (a).

The ends of branches 76, 76' are planar and normally spaced by a clearance (j). During locking, if a crushing of the cans of rods (a) leads to a deformation of said cans corresponding to clearance (j), branches 76, 76' bear against one another and prevent any increase in the force applied on the rods. Branches 76, 76' consequently make it possible to limit the locking force individually applied to each of the rods.

It has been seen hereinbefore that the spaces initially occupied by the guide tubes in the assembly constitute spaces in the bundle of rods (a) to be gripped. Moreover, as illustrated in FIG. 3, the assembly can have an uneven number of row of rods, so that one of the lateral passageways only contains one row of rods.

In order that the effectiveness of this locking is not disturbed by these spaces, rollers 78, whose axis is oriented in the direction of axis Z, are placed at the locations corresponding thereto in passageways 26. The length of these rollers is slightly less than the height of the corresponding passageway and the diameter thereof is substantially identical to the diameter of the rods. Thus, the grid is completed and the effectiveness of locking is retained.

As indicated hereinbefore, the actual locking or clamping is performed by moving the parts 54a, 54b towards the interior of recesses 46a, 46b, e.g. using jacks. Through the cooperation of ramps 52a, 52b and 6a, 60b, parts 48a, 48b are forced back in the manner shown to the right of FIGS. 3 and 4, in order to arrive in a stable locking position, where the parts are wedged against the planar portions of parts 54a, 54b. In this stable position, a locking force is applied in each of the passageways 26 to the end parts 34' by means of plungers 36a, 36b and elastic washers 44a, 44b carried by the latter.

Thus, in each passageway, there is the locking of two rows of rods, each rod being gripped between two adjacent mobile members 34. Moreover, if there is excessive crushing of the can of certain of the rods, said crushing is limited by the abutment of the ends of the branches 76 of mobile members 34 between which said rods are locked.

When the rods have been gripped in this way, they can be transported with the aid of apparatus 10 up to a rod release station, where is provided in fixed manner another set of jacks for actuating parts 54a, 54b. as a result of these jacks, parts 54a, 54b are brought into the position shown to the left in FIG. 3, in order to reduce the locking force applied to the ends of the rods. Under the action of springs 74, the rods are ejected out of the apparatus by introducing bars 70 into perforations 32 and 20, as illustrated to the left in FIG. 4. As a variant, springs 74 can be eliminated. The rods (a) are then ejected from apparatus 10 by the abutment of plate 68 against a fixed abutment located at the rod release station.

Obviously, the invention is not limited to the embodiment described in exemplified manner hereinbefore and covers all variants thereof.

It is firstly pointed out that there could be twice as many partitions 24, the passageways 26 defined between said partitions then receiving in each case a single row of rods (a). Moreover, the filling of the spaces of the group or bundle by rollers 78 can be avoided by using differently shaped parts 34 at said spaces.

Finally, it is also possible to use different clamping or locking means from those described for exerting the longitudinal locking force within each of the passageways. In particular, said locking means might only be placed in one of the lateral portions of the body of the apparatus. Moreover, elastic washers 44a, 44b could be replaced by any other equivalent elastic devices, such as compression springs.

I claim:

1. Apparatus for gripping a bundle of rods (a) arranged in the form of parallel rows of at the most (n) rods, in accordance with a square grid in a nuclear fuel assembly, characterized in that:

said apparatus comprises a body (12) having a central portion (14) provided with a rectangular recess, parallel partitions (24) subdividing said central portion into (p) passageways (26), each of which is able to receive the ends of the rods of, at the most, two rows of adjacent rods; (p) rows of (n+1) mobile members (34,34') located in each of the (p) passageways (26), in such a way that the end of each rod can be placed between two adjacent mobile members of the same passageway; locking means (36a, 36b, 48a, 48b, 54a, 54b) located in said body (12) on at least one side of said central portion (14), actuation of said locking means applying to the ends of the rods (a) and the mobile members (34, 34') contained in each of the passageways (26) a force tending to lock each rod between two adjacent mobile members of the same passageway.

2. Apparatus according to claim 1 adapted to the gripping of a bundle of rods with less than (n) rods in certain of said parallel rows, thus defining spaces in said square grid, characterized in that the apparatus comprises rollers (78) having an external diameter substantially equal to that of the rods, said rollers being placed between certain of the mobile members (34) in order to fill the spaces in the grid.

3. Apparatus according to any one of the claims 1 or 2, characterized in that each of the passageways (26) can receive the ends of rods (a) of two rows of adjacent rods, the mobile members (34, 34') being shaped like crosses and having a branch (76, 76') placed between two rows of adjacent rods of a same passageway and whereof one end can bear on one end of said branch (76, 76') of the adjacent mobile member, in order to limit the force applied to the rods during the putting into operation of the locking means.

4. Apparatus according to claim 1, characterized in that it also comprises an ejector (66) having a plate (68) mobile with respect to body (12) in a direction orthogonal to the rectangular recess, said plate having a bundle of bars (70) disposed according to a grid identical to that of the rods (a) and able to take the place of the latter, in order to eject same from the gripping apparatus (10) following slackening of the locking means.

5. Apparatus according to claim 4, characterized in that it also comprises elastic means (74) moving the ejector (66) towards a position in which the bars (70) are placed between mobile member (34, 34') in place of rods (a).

6. Apparatus according to claim 1, characterized in that the locking means comprise two rows of (p) plungers (36a, 36b) located in body (12), on two opposite sides of said central portion (14), one plunger of each row penetrating each of the passageways (26) at the opposite ends thereof and actuating means (48a, 48b, 54a, 54b) able to move the plungers (36a, 36b) towards said central portion (14) to exert said force on the ends of the rods (a) and the mobile members (34, 34').

7. Apparatus according to claim 6, characterized in that each plunger (36a, 36b) is in two sliding portions (40a, 40b, 42a, 42b) and comprises an elastic device (44a, 44b) by which the force exerted by the actuating means (48a, 48b, 54a, 54b) is transmitted between said portions.

8. Apparatus according to claim 6, characterized in that the actuating means comprise two wedge devices (48a, 48b, 54a, 54b) acting on each row of plungers (36a, 36b), said wedge devices being able to occupy a stable opening position and a stable closing position.

9. Apparatus according to claim 8, characterized in that each wedge device comprises a first part (48a, 48b) mobile in body (12) in a sliding direction away from and towards the central portion (14), said first part bearing on one of the rows of plungers (36a, 36b) and a second part (54a, 54b) mobile in body (12) in a direction orthogonal to the sliding direction of the first part, said two parts cooperating with one another by means of a system of ramps (52a, 52b, 60a, 60b) terminated by planar portions defining said stable opening and closing positions.

* * * * *